United States Patent
Monsarrat

(10) Patent No.: US 12,249,038 B1
(45) Date of Patent: Mar. 11, 2025

(54) NAVIGATING REAL AND VIRTUAL WORLDS WITH DISPARATE TERRAINS IN AUGMENTED REALITY

(71) Applicant: Monsarrat, Inc., Santa Monica, CA (US)

(72) Inventor: Jonathan Monsarrat, Santa Monica, CA (US)

(73) Assignee: Monsarrat, Inc., Santa Monica, CA (US)

( * ) Notice: Subject to any disclaimer, the term of this patent is extended or adjusted under 35 U.S.C. 154(b) by 0 days.

(21) Appl. No.: 18/887,295

(22) Filed: Sep. 17, 2024

(51) Int. Cl.
G06T 19/00 (2011.01)

(52) U.S. Cl.
CPC ............ *G06T 19/006* (2013.01)

(58) Field of Classification Search
None
See application file for complete search history.

(56) References Cited

U.S. PATENT DOCUMENTS

| | | |
|---|---|---|
| 10,521,962 B1 | 12/2019 | Nussbaum et al. |
| 11,112,250 B1 | 9/2021 | Monsarrat |
| 11,430,187 B1 | 8/2022 | Monsarrat |
| 11,776,206 B1 | 10/2023 | Gupta et al. |
| 2005/0049022 A1 | 3/2005 | Mullen et al. |
| 2005/0216181 A1 | 9/2005 | Estkowski et al. |
| 2009/0005140 A1 | 1/2009 | Rose et al. |
| 2010/0259610 A1 | 10/2010 | Petersen |
| 2011/0009241 A1 | 1/2011 | Lane et al. |
| 2011/0208425 A1 | 8/2011 | Zheng et al. |
| 2013/0339098 A1 | 12/2013 | Looman et al. |
| 2014/0171962 A1 | 6/2014 | Kang |
| 2014/0221090 A1 | 8/2014 | Mutschler et al. |
| 2016/0004335 A1 | 1/2016 | Hosenpud |
| 2016/0232713 A1 | 8/2016 | Lee et al. |
| 2016/0232715 A1 | 8/2016 | Lee et al. |
| 2017/0068323 A1 | 3/2017 | West et al. |
| 2017/0255256 A1 | 9/2017 | Kim et al. |
| 2017/0263032 A1 | 9/2017 | Cricri et al. |
| 2018/0033204 A1 | 2/2018 | Dimitrov et al. |
| 2018/0345129 A1 | 12/2018 | Rathod |

(Continued)

FOREIGN PATENT DOCUMENTS

| | | |
|---|---|---|
| EP | 3839699 A1 | 6/2011 |
| WO | 2013074997 A1 | 5/2013 |

OTHER PUBLICATIONS

Non-Final Office Action mailed Nov. 20, 2024 in Related U.S. Appl. No. 18/887,260.

*Primary Examiner* — Nicholas R Wilson
(74) *Attorney, Agent, or Firm* — David Thibodeau; VLP Law Group LLP

(57) ABSTRACT

Methods and systems for a virtual simulation experience where a user holds or wears a computer device that displays a virtual world, and the user's physical movement is used to control movement of a virtual avatar through that virtual world. A virtual world coordinate system, including the ground planes, is matched to the real world, allowing the virtual world to be shown on the device screen as overlaid onto the real world view. If the user's height in the virtual world changes, the simulation system takes visual samples of the real world to create a "virtual landscape" at the correct new perspective, overlaying part of the real world landscape. Enhancements include handling real world landscapes that are not flat and level, and creating perspective views of the real world sky.

18 Claims, 16 Drawing Sheets

Real World Topography
301

Virtual World Topography
302

Virtual Height is Computed from Real World XY Position and Virtual World Topography

(56) References Cited

U.S. PATENT DOCUMENTS

| | | |
|---|---|---|
| 2019/0019378 A1 | 1/2019 | Greiner |
| 2019/0033960 A1 | 1/2019 | Ho |
| 2019/0073832 A1 | 3/2019 | Kim |
| 2019/0180509 A1 | 6/2019 | Laaksonen et al. |
| 2019/0240568 A1 | 8/2019 | Routhier et al. |
| 2019/0265055 A1 | 8/2019 | Chen et al. |
| 2019/0301953 A1 | 10/2019 | Harvey et al. |
| 2020/0049522 A1 | 2/2020 | Wang et al. |
| 2020/0133618 A1 | 4/2020 | Kim |
| 2020/0184221 A1 | 6/2020 | Alexander |
| 2020/0279407 A1 | 9/2020 | Liljeroos et al. |
| 2020/0284416 A1 | 9/2020 | Greiner et al. |
| 2020/0294350 A1 | 9/2020 | Soon-Shiong |
| 2020/0341541 A1 | 10/2020 | Olah-Reiken |
| 2020/0384351 A1 | 12/2020 | Asano et al. |
| 2021/0201581 A1 | 7/2021 | Xie et al. |
| 2023/0277943 A1 | 9/2023 | Hegedüs et al. |
| 2024/0019935 A1 | 1/2024 | Kondo et al. |

System to Generate Augmented Reality Experiences

Fig. 2 In Prior Art, the User's Virtual Viewpoint Is Set to Match the Real World Viewpoint Virtual Height is Computed from Real World XY Position and Virtual World Topography

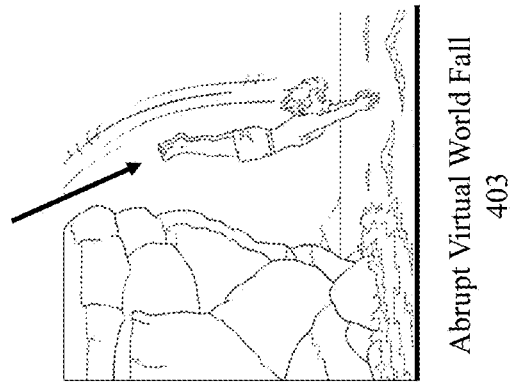
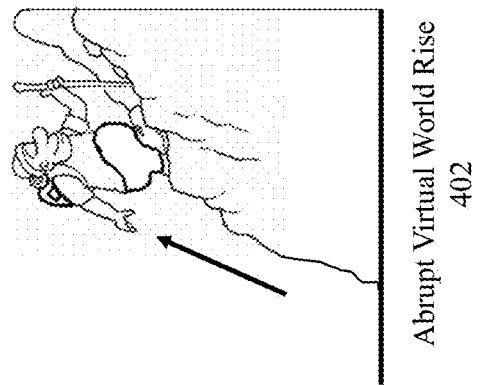
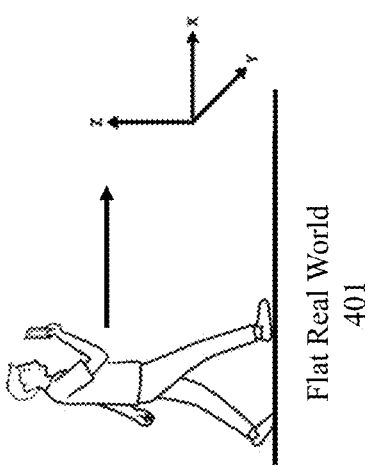
Abrupt Height Changes in Virtual Topography
Fig. 4

Fig. 5 Handling Abrupt Height Changes in Virtual Topography

Views from Differing Heights

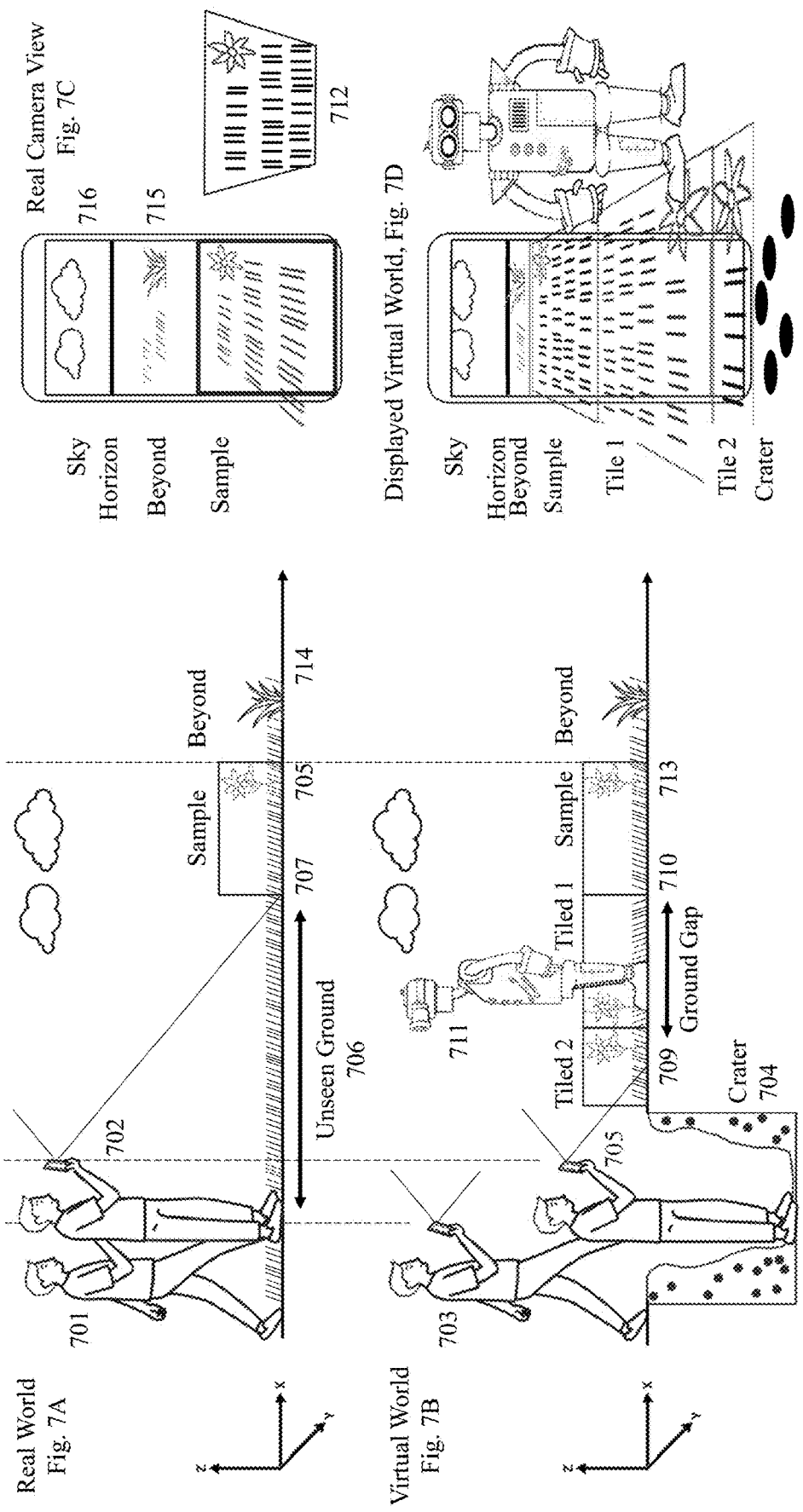

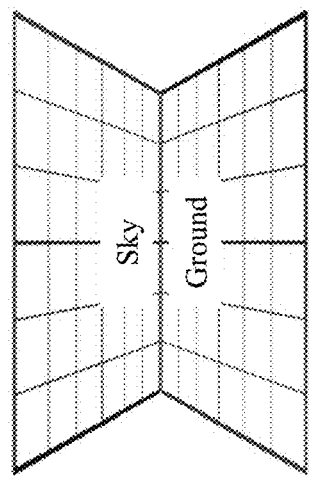
Sky As a Flat Plane
Fig. 8A
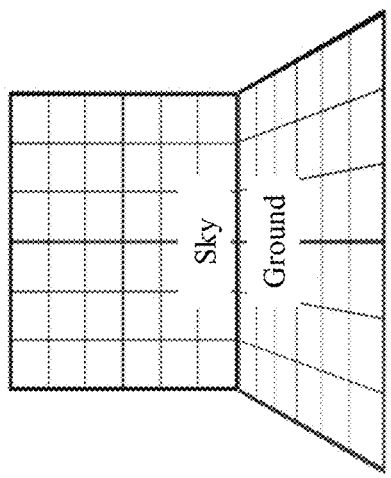
Sky As a Flat Backdrop
Fig. 8B
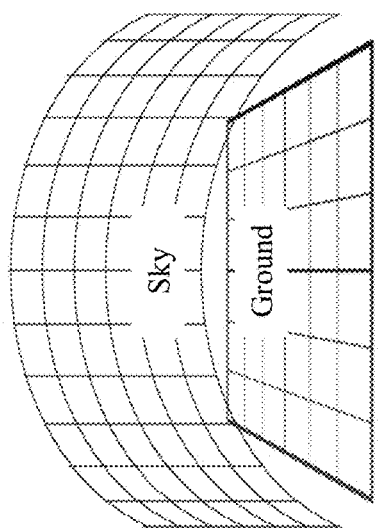
Sky As a Panoramic Backdrop
Fig. 8C
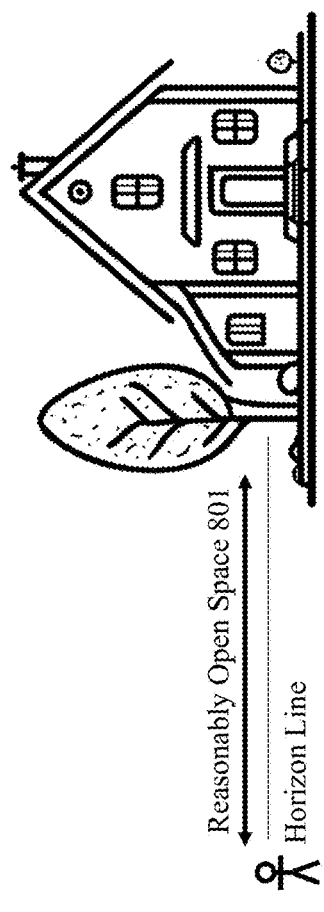
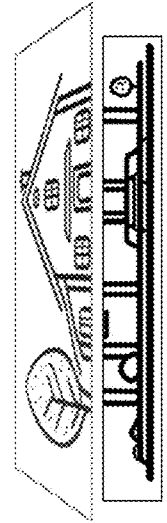
Outdoor Obstacles Generally Block More of the Sky View Than Ground View, Because They Are Tall
Fig. 8D

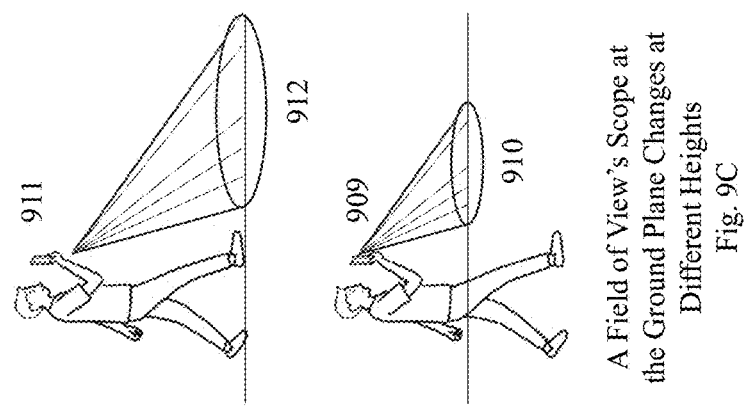
Fig. 9C A Field of View's Scope at the Ground Plane Changes at Different Heights
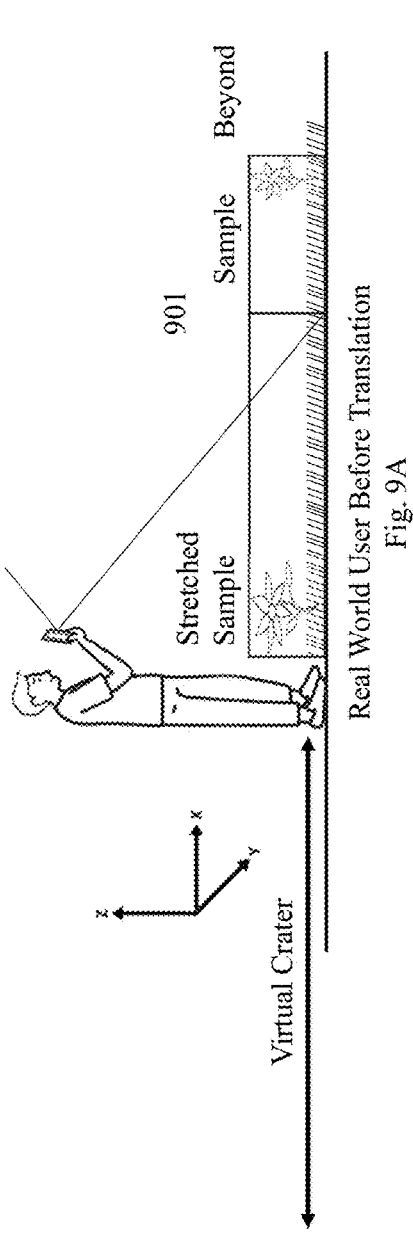
Fig. 9A Real World User Before Translation
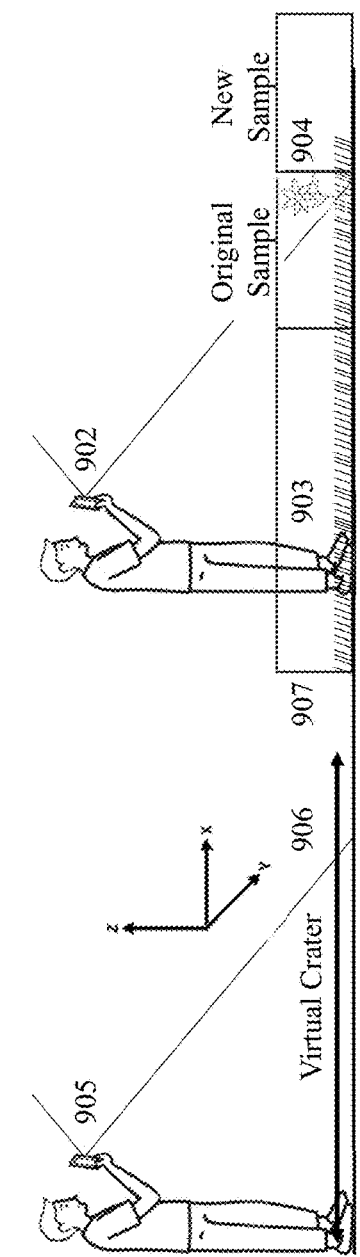
Fig. 9B Real World User After Translation Forwards or Backwards User Moves Along the Y Axis User Rotates Around the Z Axis

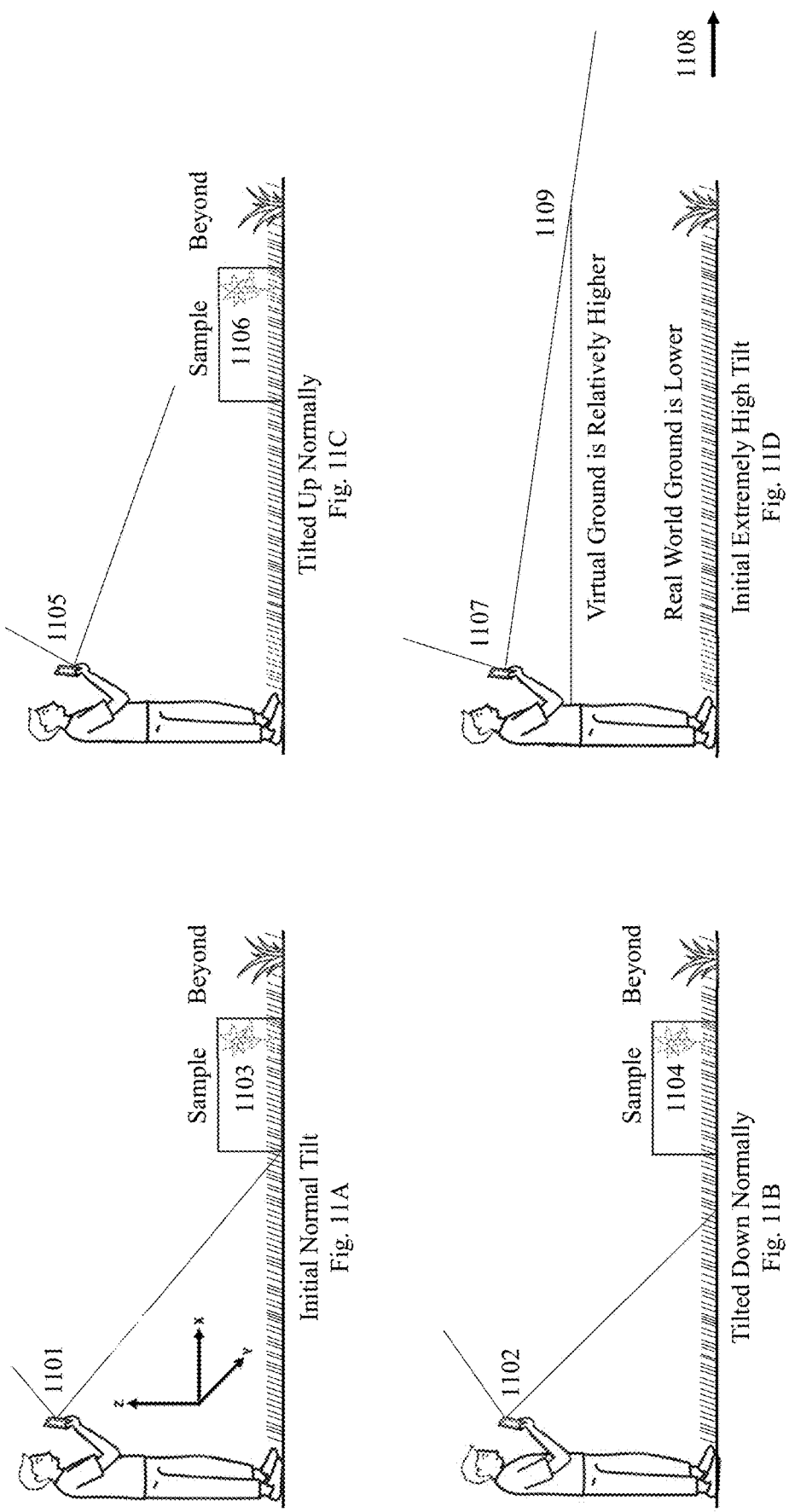

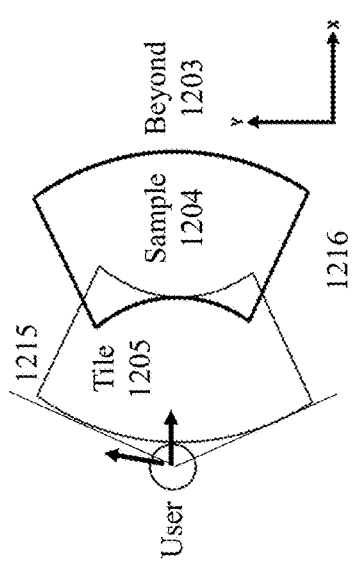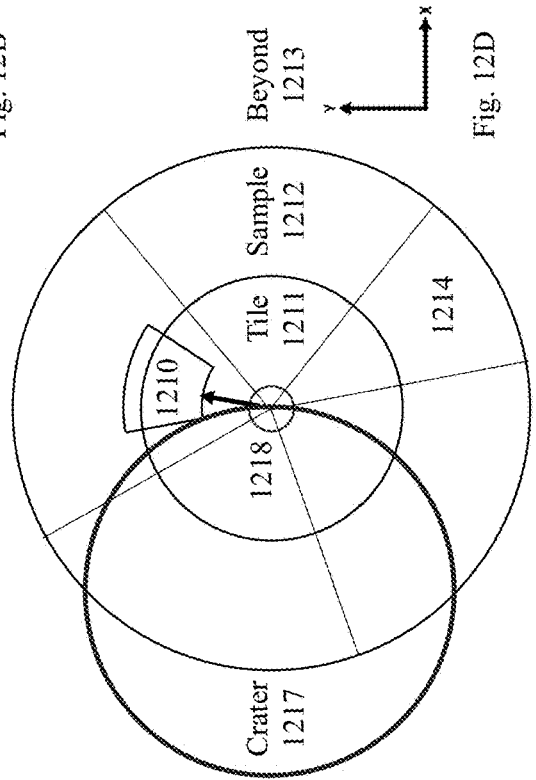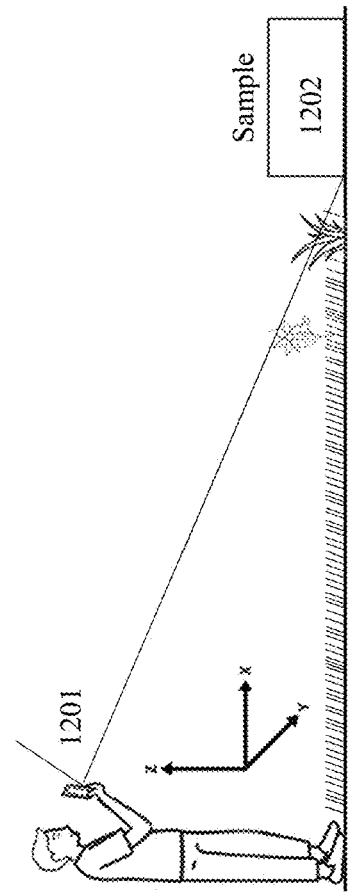

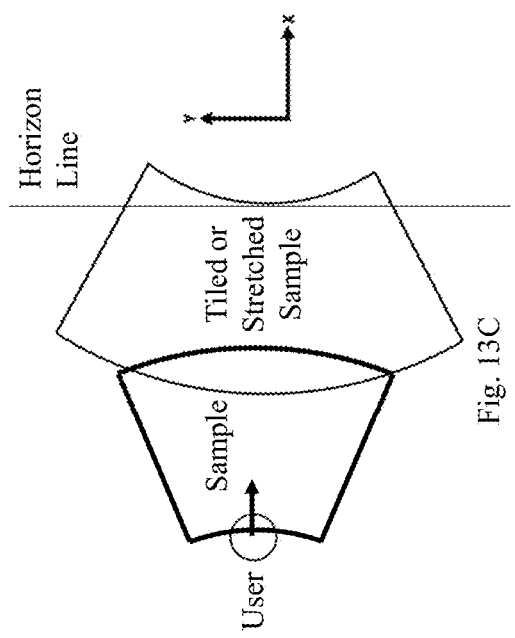
Fig. 13C
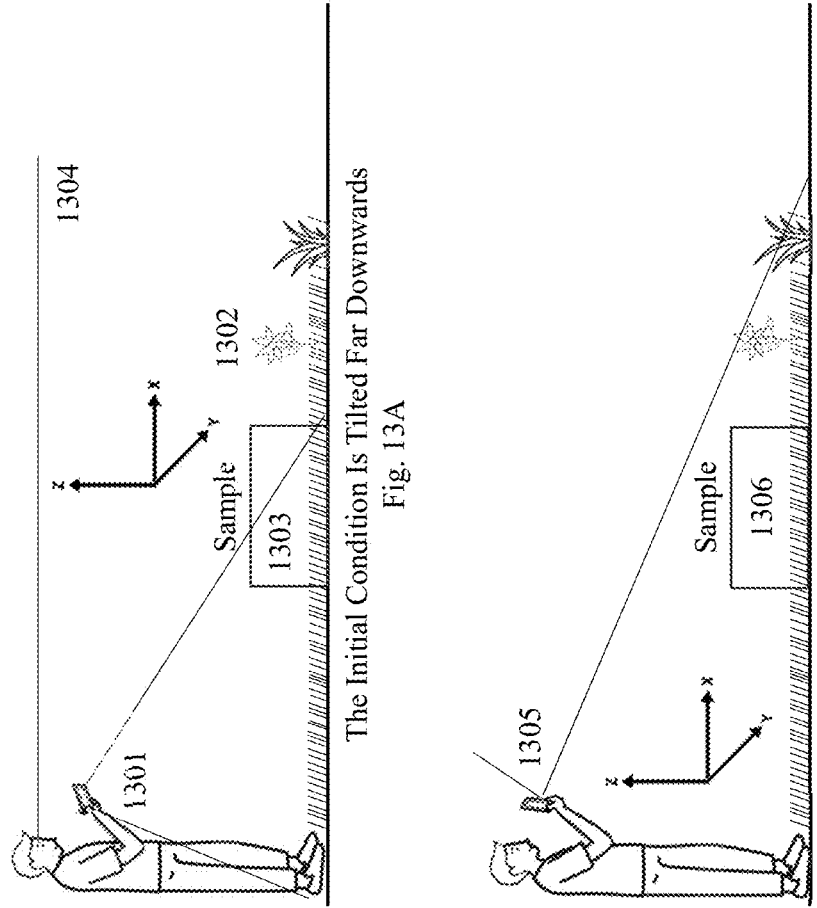
Fig. 13A  The Initial Condition Is Tilted Far Downwards
Fig. 13B  Then Tilt Up Dramatically

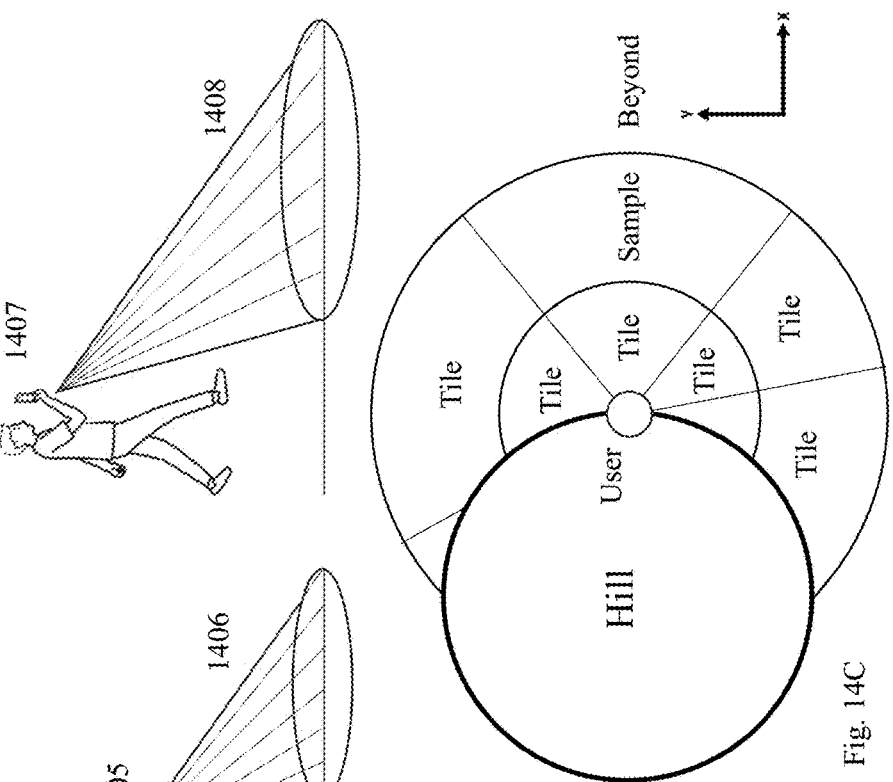
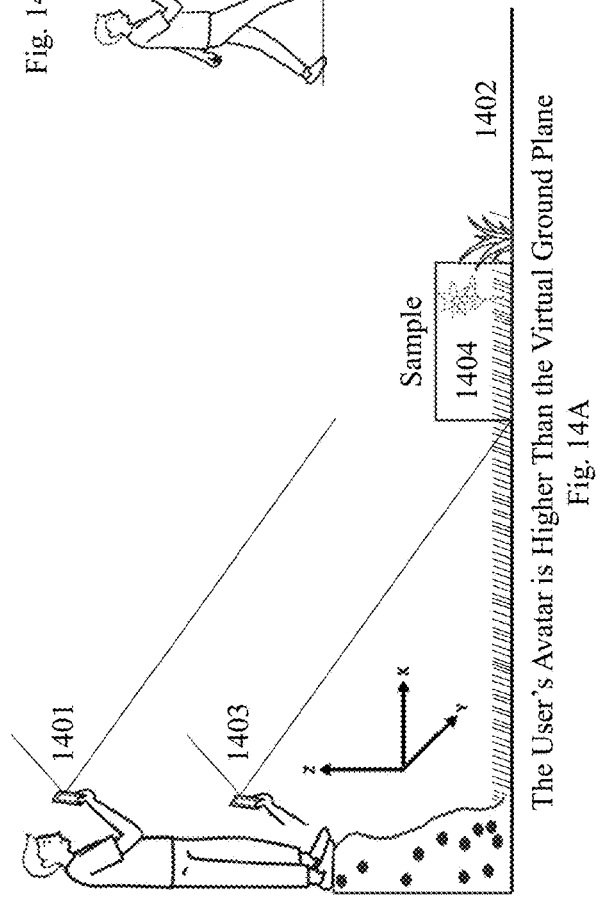
Fig. 14A The User's Avatar is Higher Than the Virtual Ground Plane
Fig. 14B
Fig. 14C

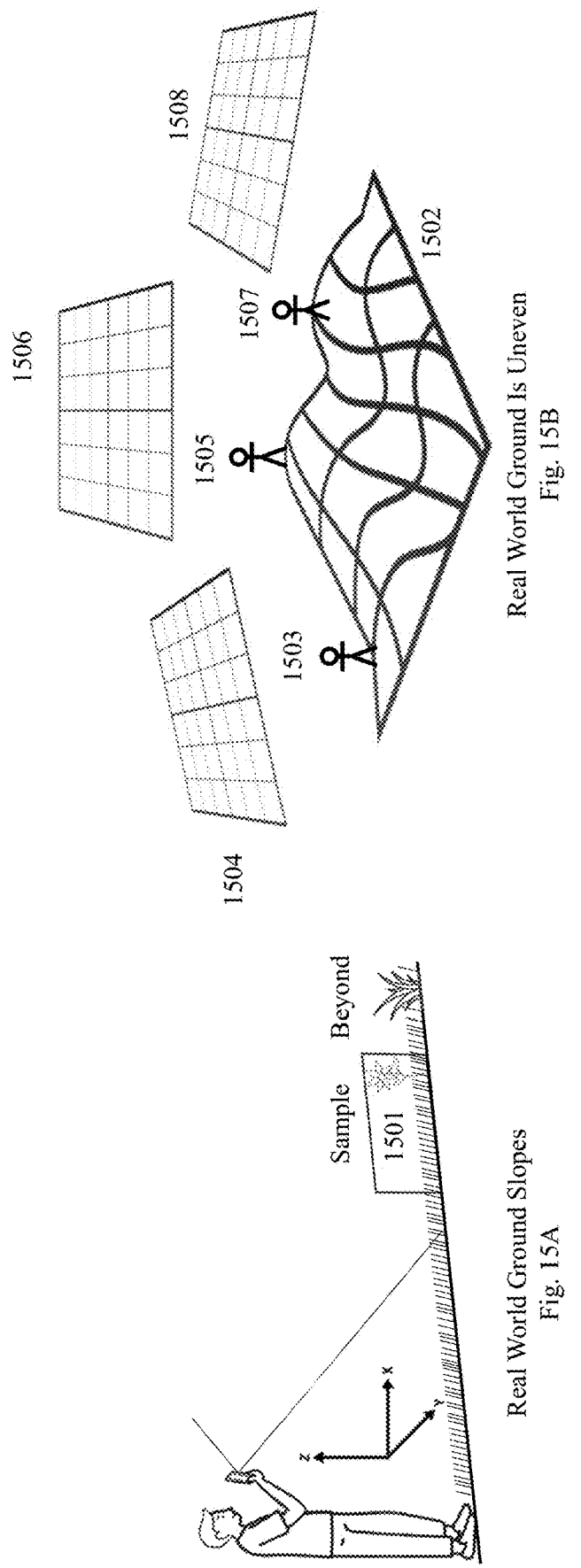

NAVIGATING REAL AND VIRTUAL WORLDS WITH DISPARATE TERRAINS IN AUGMENTED REALITY

TECHNICAL FIELD

This patent application relates to augmented reality experiences, where a user's mobile device tracks its real world location and also presents a camera view of the real world.

BACKGROUND

In a system that generates augmented reality experiences, a user navigates both the real world and a virtual world. The user wears or carries a mobile device, which tracks the user's position and orientation in the real world. The position and orientation information is then used to move a user's virtual viewpoint through the virtual world. When the real world viewpoint and virtual world viewpoints match, virtual objects can be drawn over a real world camera view from the mobile device. This generates the powerful, immersive illusion that the virtual world objects are truly present in the real world.

More recently, augmented reality simulation systems give an even greater immersive feeling by allowing users to stand up and physically walk around to navigate the virtual world. For example, in U.S. Pat. No. 11,112,250 B1 entitled "System for automatic instantiation of a generically described location-based travelling experience to specific map coordinates and real-time conditions" assigned to Monsarrat, Inc., the assignee of the present application (incorporated by reference in its entirety herein), a virtual world space is given an alignment with a real world space. Every step that a user takes in the real space is correlated with a step in the virtual space, to provide a so-called Location Based Travel Experience (LBTE).

A necessary requirement of such a system is that the topographies of the real and virtual worlds must match. For example, as is typical, if the real world were flat and level, and the virtual world had a crater for the user to explore, walking far below ground level, the user would have no way in the real world to mimic a downwards movement in the real world to get there, and the real world viewpoint from the mobile device's camera would not match a downwards movement.

SUMMARY OF PREFERRED EMBODIMENTS

Virtual worlds that are completely flat are not as exciting as they might otherwise be. A simulation system should preferably give the player a visceral feeling of moving vertically in the virtual world, even though the player is not actually moving vertically in the real world.

Accordingly, this patent application describes a simulation system to generate an augmented reality experience when the real world ground and the virtual space ground may have different topographies.

As with prior art systems, the user wears or carries a mobile device, such as a smart phone or Augmented Reality (AR) headset. The mobile device:
  tracks the user's position and orientation in the real world,
  has a camera seeing the real world view, and
  has a screen showing the real world view with an augmented reality overlay.

A method to provide a virtual experience may thus include several aspects. First, a definition for the user to navigate is provided, including a 3D virtual space terrain that is not flat. The virtual space terrain may for example include holes or hills. An initial correlation relates a virtual coordinate system associated with the virtual space to a physical coordinate system associated with a physical space. Location data of the portable electronic device within the physical space is also maintained, with the location data responsive to the estimates of physical location of the portable electronic device, and including position, orientation, and acceleration data;

A user avatar position in the virtual space is then correlated to a real world user ground plane location within the physical space, including an avatar virtual height calculated from the virtual space terrain.

A display is then created on the portable electronic device in a particular way. This display includes (i) a real world camera view; and (ii) layered above that real world camera view, a view of elements from the virtual space, including a rendering of 3D models where the virtual terrain changes from being flat.

As the avatar virtual height moves lower than a real height of the user in the physical space, the approach further involves taking visual samples of a real world landscape and tiling and/or mirroring such visual samples, based on a virtual world perspective.

As a result, the virtual world displayed on the user's device is composed of (a) the virtual world ground and (b) the virtual world sky (everything above the horizon line and (c) the contents of the virtual world like trees, creatures, buildings, most of which sit on the virtual ground. A realistic seeming virtual ground can then be generated by further using portions of the real-time camera view of the real world ground.

According to further details described herein, the simulation system may create the augmented reality experience in a particular manner:

1. When the simulation begins, the mobile device, perhaps using the camera and/or using other sensors such as an accelerometer, identifies a real world ground plane, the "real XY plane", which may be flat and level.
2. The mobile device then tracks the user's movements, so that the real world coordinate system's position and orientation, relative to the user, is known at all times.
3. A virtual world is provided that is not necessarily flat or level.
4. The virtual world is rendered on the mobile device with its coordinate system aligned to the real world coordinate system. In this way, virtual world objects such as rocks, trees, and creatures that stand on the virtual ground can look like they are standing on the real world ground.
5. In the real world, the user then walks to a point $X_R$, $Y_R$ in the real XY plane, that is, the ground plane of the real world coordinate system.
6. Using the relative alignment of the virtual and real worlds, the system calculates a user avatar location $X_V$, $Y_V$ that corresponds to the user's real position $X_R$, $Y_R$.
7. The system then calculates the user's virtual height $Z_V$ as the height given by the virtual terrain at $X_V$, $Y_V$.
8. The system then calculates a horizon line at the same height as the user's eyeline and segments the real world camera view into two parts:
   a. the ground plane, GP, if the ground is in view, and
   b. the sky, S, which is everything above the real world horizon line.
9. The system then generates a "virtual ground plane" that resembles the local real world ground plane, by mapping the GP to the virtual ground plane, stretching to the horizon. The sky space S is then mapped to the space above the horizon of this virtual ground plane.

10. Then the system then renders a view on the user's device as an overlay of the virtual world on top of this virtual ground plane.

The resulting presentation is not perfect, since special cases can force the system to jarringly reset the virtual ground plane, but it is typically good enough for suspension of disbelief, especially in outdoor real world spaces.

BRIEF DESCRIPTION OF THE DRAWINGS

FIG. 4 shows a special case when the virtual terrain changes abruptly.

FIGS. 7A to 7D build a "virtual ground" when the user's avatar sinks below ground level.

FIGS. 8A to 8D show how to build a "virtual sky" above that virtual ground.

FIGS. 9A to 9C show how to handle user translation forwards or backwards.

FIGS. 11A to 11D show how to handle the user tilting the device camera view normally.

FIGS. 12A to 12D show how to handle the user tilting the device dramatically downwards.

FIGS. 13A to 13C show how to handle the user tilting the device dramatically upwards.

FIGS. 14A to 14C build a virtual ground when the user's avatar rises above ground level.

FIG. 15 shows how to handle a real world ground surface that is not flat or not level.

DETAILED DESCRIPTION OF ILLUSTRATIVE EMBODIMENT(S)

A description of preferred embodiments follows.
Prior Art System for Augmented Reality Walking Experiences The embodiments described herein assume the existence of a technology that provides virtual Location-Based Experiences (LBEs). One example of such a technology was described in the aforementioned U.S. Pat. No. 11,112,250B1. As explained in that patent, an LBE maps virtual user experience locations to real world locations using a graph of location elements, where nodes represent locations, and parent nodes define routes in-between locations and also define location properties to be inherited by child nodes. The location elements may further include map descriptors that refer to map metadata, including metadata; real-time descriptors, including at least whether locations are open or closed, or behavior of other users; experiential descriptors, including whether line-of-sight between locations should be kept or avoided, a mode of transportation users are expected to employ or whether the route needs to be entirely completed within a set time; and nesting and inheritance properties, such that larger LBEs may be assembled from contained smaller LBEs. A route can be laid out by the user physically moving from one location to next location in the real world map and selecting points on the real world map along the route; or by operating a flow based layout model where each node in sequence is automatically placed relative to an initial location, via a graph drawing algorithm that identifies possible location placements relative to element constraints based on a best-fit layout.

The present application is directed to a particular way in which representations of the virtual space are presented on the mobile device.

Figure 1:
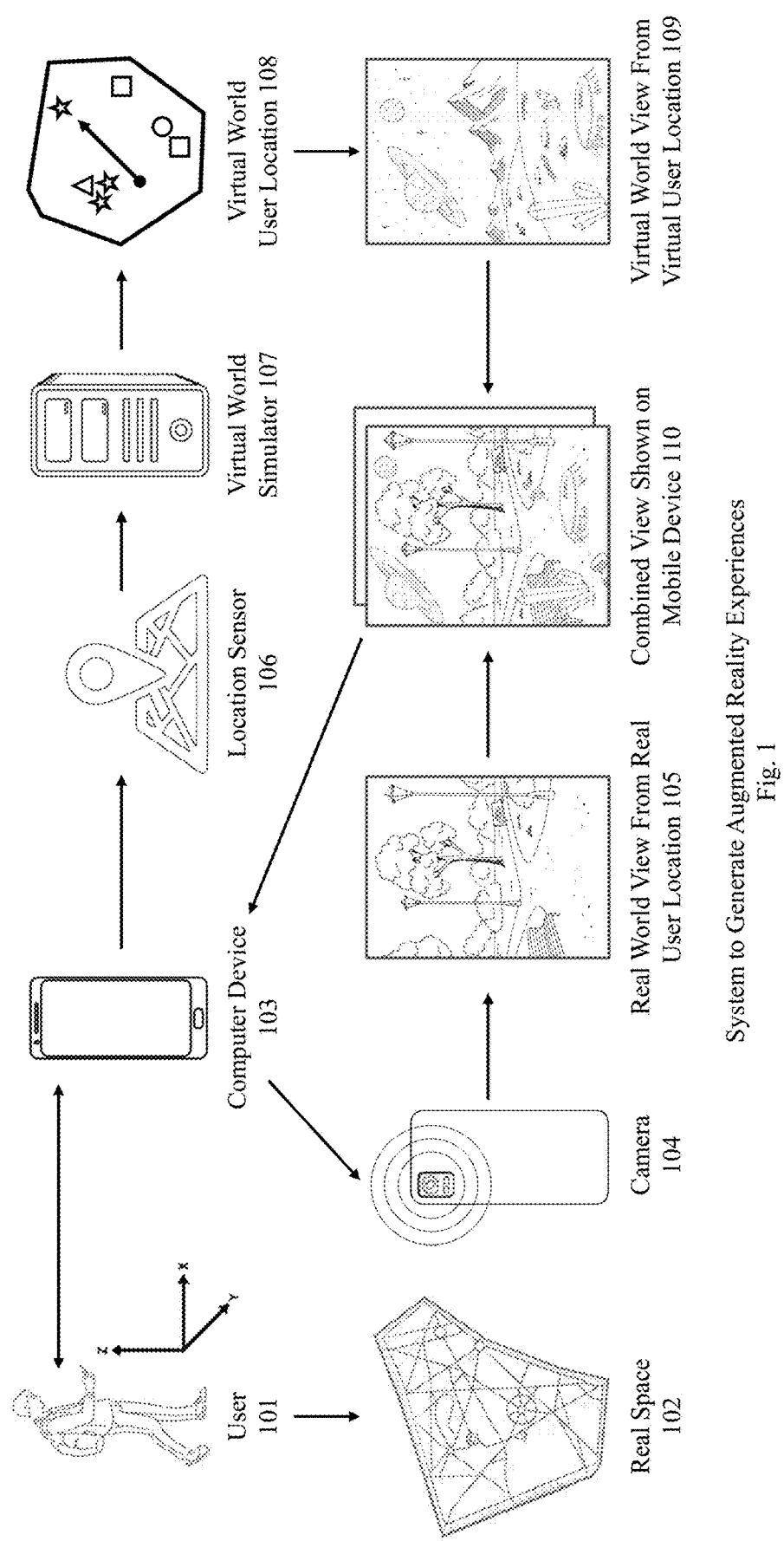
FIG. 1 shows the architecture for a system for augmented reality experiences.

FIG. 1 shows the system for prior art that presents augmented reality experiences.

A User 101 walks, for example along the X-Y plane in the X-axis direction, through a Real World Space 102 such as a local park, holding or wearing a Computer Device 103 such as a smart phone or AR headset.

The computer device 103 has a Camera 104 that records a real-time Real World View 105 which is shot from the viewpoint of the user's current location. Because the User is looking at this view on the computer device, the User's eyeline, called the view vector, is the same as the device camera's view vector.

The Computer Device 103 also has one or more Location Sensor(s) 106 that sense the location, including position and orientation, of both the computer device and also the user. Assuming that the User 101 is walking through a flat, level, open space in the real world, the user's height $Z_R$ is always zero and the (AR) essential location information is:

the $X_R$ $Y_R$ position in the real world ground plane, and the user's view vector, which is the orientation around X, Y, and Z axes.

The user's eye is not placed directly on top of the device's camera, but this small gap causing a slight perspective shift can typically be ignored. An adjustment may be made to adjust for any difference between the location of the portable device camera and the user's eyes, however. In one example, the user's view vector can be approximated as a selected distance (such as 0.3 meters) behind and along the device camera's view vector.

This information is fed into a Virtual World Simulation System 107 which generates a virtual world to provide a Location Based Experience (also referred to elsewhere as an Augmented Reality (AR) experience herein). The Simulation System 107 maps a Virtual World 108 to the Real World Space 102, such that the user can explore every point in the virtual world by walking in the real world.

More specifically, the Virtual World Simulation System 107 uses the user's real world location to calculate the User's Location $X_V Y_V$ in the Virtual World 108. Traditionally in augmented reality experiences, the virtual world 108 is also flat and level, so $Z_V$ is zero.

Then the Simulation System 107 uses the user's virtual view vector to render a 3D view of the Virtual World 109 as seen by the user's virtual position and orientation. This virtual view is overlaid on top of the Real World View 105 to create a Combined View 110, which is shown to the user on the screen of the Computer Device 103.

It should be understood that the Simulation System 107 may be implemented in large part by one or more processors that are external to the Computer Device 103, such as servers or cloud computers connected wirelessly to communicate with, exchange data with, and control the Computer Device 103. However, in some other implementations, the Simulation System 107 may be entirely resident withing the Computer Device 103.

Traditionally, Real and Virtual Viewpoints Are Synchronized in AR

Figure 2:
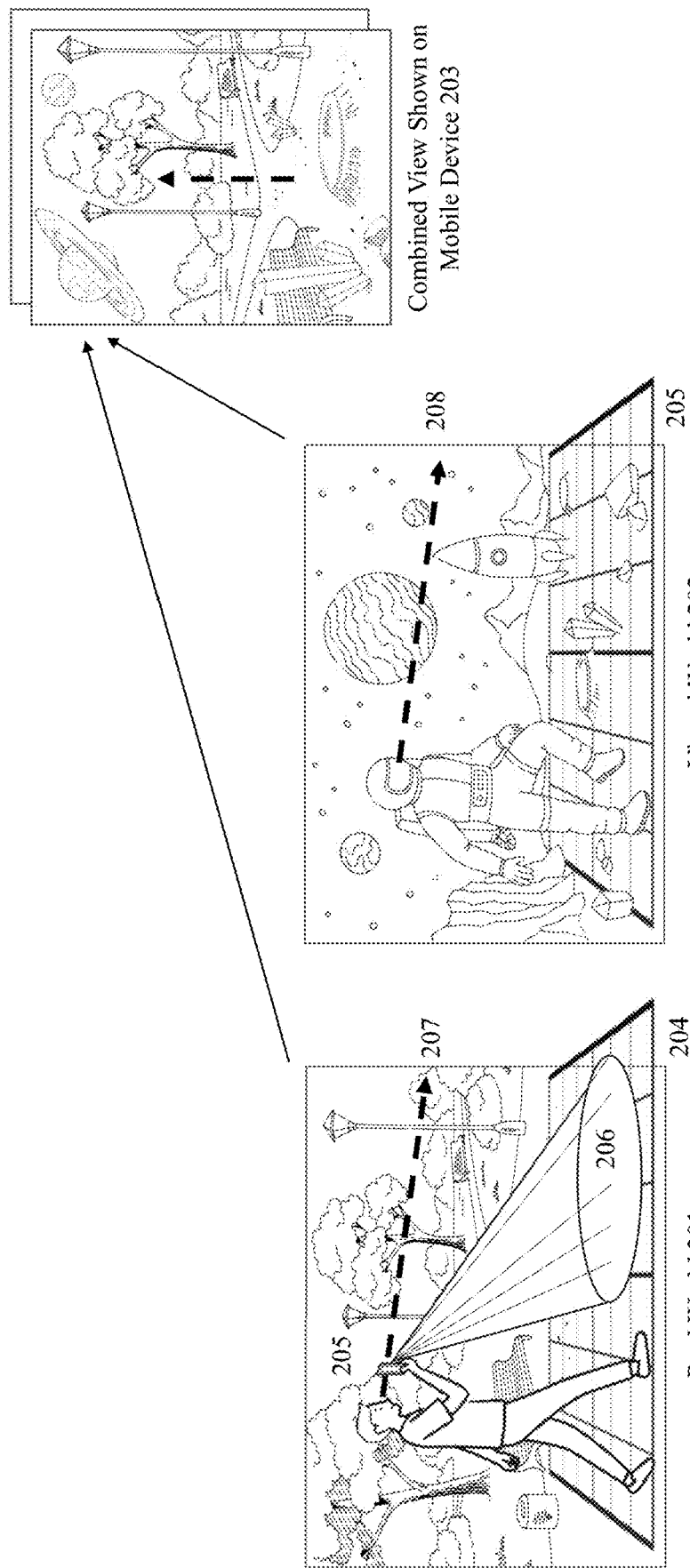
FIG. 2 shows how the user's real and virtual viewpoints are traditionally synchronized.

As in FIG. 2, for this simulation system 107 to work, movements in the Real World 201 should be matched precisely in the Virtual World 202, for the Combined View 203 to look like a single view along a single view vector.

So, the user's virtual position and orientation relative to the Virtual World Ground Plane 205, including virtual height, is set to match the user's real position and orientation relative to a Real World Ground Plane 204, which can be detected by the Computer Device 205, such as visually through the camera 206 or the device's accelerometer.

The User's Virtual World Eyeline 208 is set to the User's Real World Eyeline 207.

How Virtual Height Can Be Calculated from Real World Movement

Initial assumptions can include:
the Real World Topography 301 is flat and level, and
the user will walk normally and therefore the real world user's eyeline will remain at approximately the same height,
and the Virtual World Topography 302 is not flat.

Figure 3:
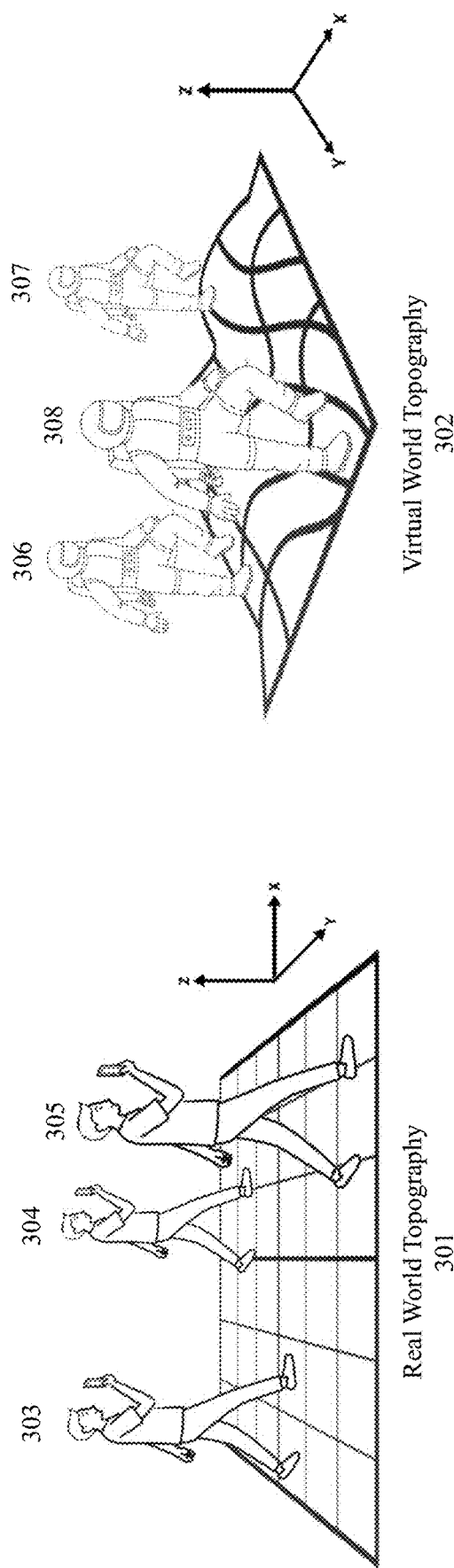
FIG. 3 shows how the user avatar's height is the virtual world can be calculated.

As in FIG. 3, if the user moves to different $X_R$, $Y_R$ positions 303, 304, and 305 in the real coordinate system, with $Z_R=0$, the Simulation System 107 calculates the user's corresponding $X_V$, $Y_V$ positions in the virtual world 306, 307, and 308. The system then looks up the $Z_V$ height at that $X_V$, $Y_V$ position in the Virtual World's Topography 302. The virtual world $X_V$, $Y_V$, $Z_V$ position can then be used to render a virtual avatar (such as the spaceman shown) representing the user in the virtual world.

So, the user's virtual height at 306 is slightly above ground level, is even higher at 307, and returns to ground level at 308. Meanwhile, in the real world, the user continued to walk horizontally and never changed vertical height.

Handling Abrupt Changes in the Virtual Terrain

FIG. 4 shows how calculating the user's virtual height from the real user position and the virtual height map may be too simple at times.

In 401, the real user walks 10 steps forward along the X axis, staying at the real world ground level, while in 402 the user's virtual avatar experiences an Abrupt Virtual World Rise by climbing a mountain. If the virtual world is realistic, people do not climb mountains as quickly as walking on level ground.

Similarly, in 403 the user's virtual avatar may experience an Abrupt Virtual World Fall. The user takes one step forward in the real world 401 and suddenly in the virtual height has dropped from the cliff to the ocean. If the virtual world is realistic, falling off of a tall cliff does happen quickly, but should not be instant. It takes more time to fall than to walk one step forward.

Figure 5:
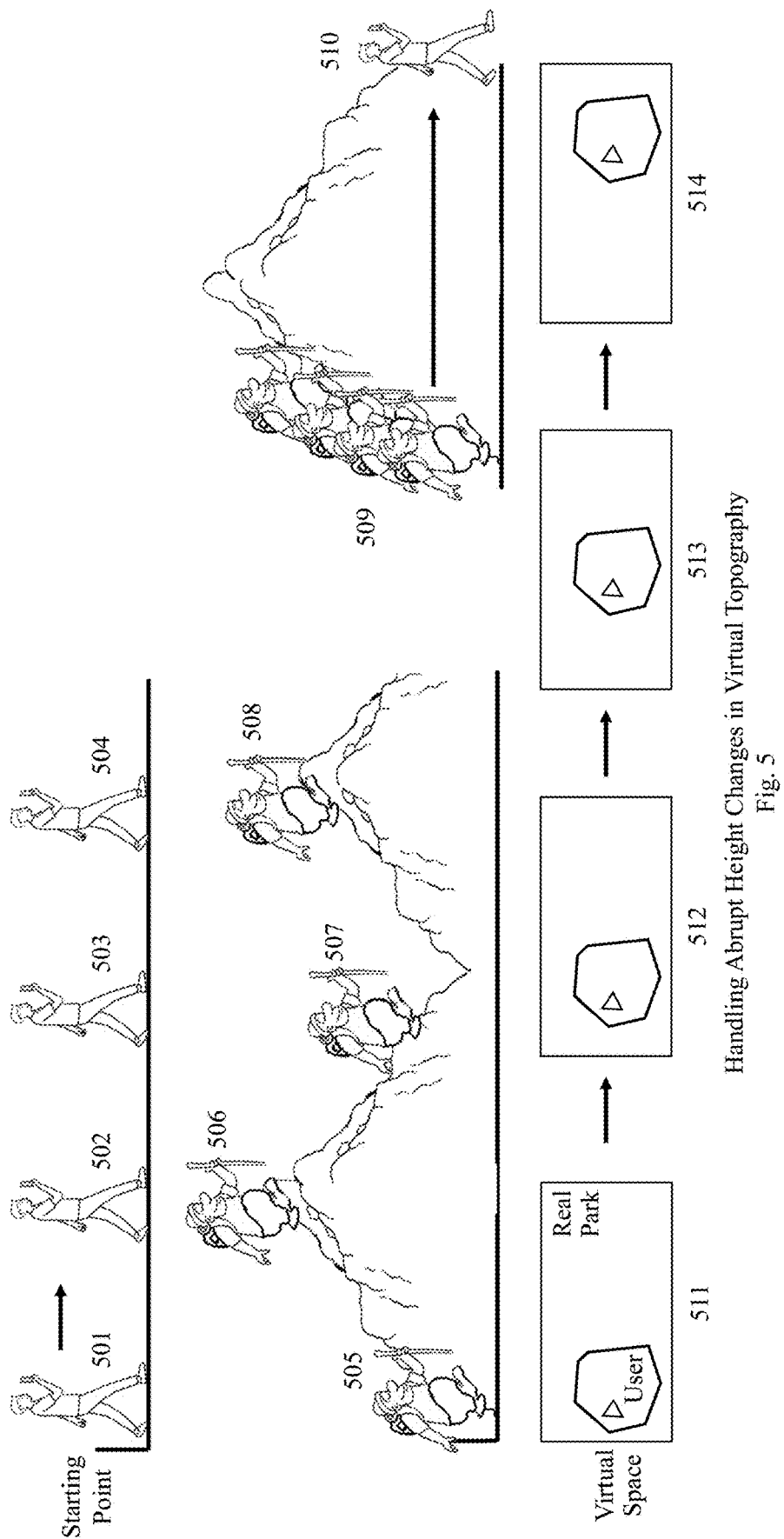
FIG. 5 shows how to handle those special cases when the virtual terrain changes abruptly.

FIG. 5 shows this problem in more detail. As the user moves forward through 501, 502, 503, and 504, the work of a few seconds, somehow the virtual mountain climber is rocketing up and down through 505, 506, 507, and 508 in the same amount of time.

Instead, the mountain climber should make slow movements forwards and upwards 509. However, this adjustment alone will result in the user's real world position 510 being misaligned with the user avatar virtual position. Such an alignment can be corrected by moving how the virtual world is aligned with the real world, as in U.S. Pat. No. 11,430,187, Enforcing Virtual Obstacles in a Location-Based Experience, assigned to Monsarrat, Inc., the assignee of the present application, which is hereby incorporated by reference.

As the real world user 510 walks 20 m forward along the X axis, the virtual mountain climber 509 advances forwards only 2 m along the X axis. So in 511, 512, 513, and 514, the virtual space itself is moved forward 18 m. This leaves the user's virtual world position (2 m ahead) still matched to the user's real world position (20 m ahead).

How Perspective Work from Different Heights

Figure 6:
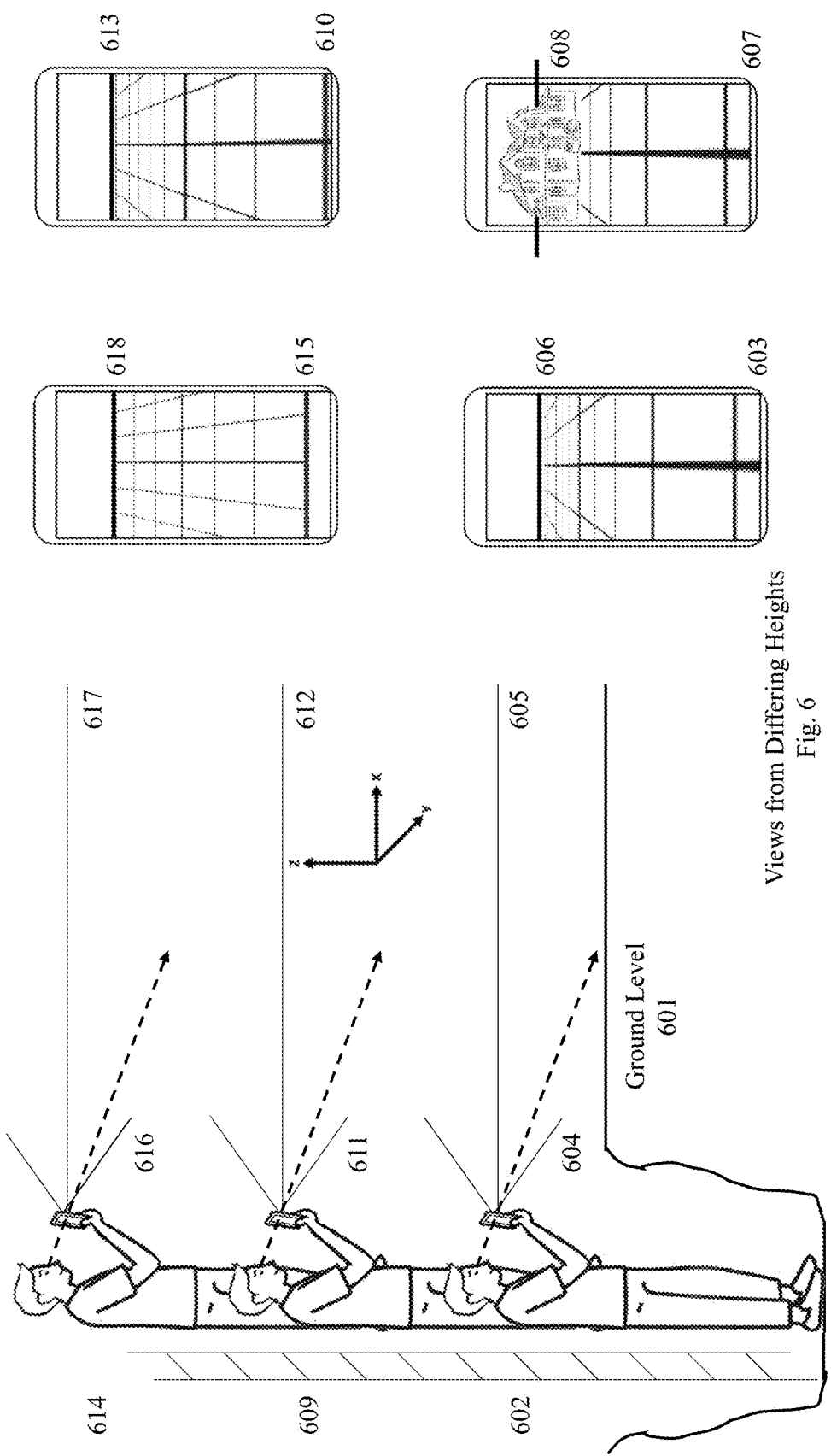
FIG. 6 shows how perspective views and horizon lines work from different heights.

FIG. 6 shows how visual views change with perspective as the user's height changes, as background for the calculations that follow. Although this figure shows the real world, perspective works the same for a virtual world shown on a device screen.

The user 602 begins standing below Ground Level 601, such as standing in a ditch. Although the user's feet are below ground level, the user's eyeline and computer device are above ground level. In this position, the user can see a view of the ground 603 on the computer device's screen, as recorded by the computer device camera.

That camera has a limited field of view 604, so the user 602 does not see the entire ground but only the portion that is visible to the camera. For example, smart phone cameras generally have a lens angle between 60° and 90°.

The horizon line 605 is always level with the viewer's eye height, even if the viewer's head is tilted. To simplify the diagram, in this case the horizon line 605 is drawn on the user's device with the mobile device as the viewer, not the user's eye. Because the user is looking slightly down, the displayed horizon line 606 is drawn towards the top of the computer device screen. If the Ground Plane 601 is flat and level, everything displayed on the computer device screen below the horizon line will be ground, and everything displayed above the horizon line will be sky.

If the real world Ground Plane 601 is a completely open space, it will terminate at the horizon line 605. If the rendered ground plane 607 ended because of an obstruction such as a building, the rendered horizon line 608 would remain in its vertical position on the computer device screen, but the ground plane 607 would appear to stop lower than the horizon line. Everything below the horizon line is still ground, but the building partially obscures it. Everything above the horizon line is still sky, the building also partially obscures it.

Then the user ascends to a higher position 609, perhaps climbing a ladder. Although the user's feet are at Ground Level 601, the user's eye height 612 is significantly above ground level. Thus the view on the computer device screen 610 is less foreshortened, and the computer device's camera field of view 611 shows even less of the ground immediately in front of the user. In other words, the visible ground point that is closest to the user along the X axis is farther away in 610 than in 603. The user's horizon line 612 is higher now, but because the user is also higher, and looking slightly downwards at the same angle, the horizon line 613 remains in the same position on the computer device screen as previously 606.

The user ascends again to an even higher level 614, and now the ground is even less foreshortened as shown 615 on the computer device, and the field of view 616 of the computer device camera leaves even less of the ground visible along the X axis. Again, user's horizon line 617 is even higher now, but because the user is also even higher, and still looking downwards at the same angle, the horizon line 618 remains in the same position on the computer device screen.

Rendering an Augmented Reality View With a Lower User Avatar

FIGS. 7A to 7D show how to render an augmented reality view, when the user's virtual avatar is lower than the real user, in the combined coordinate system. Higher virtual avatars are handled in FIG. 14.

FIG. 7A shows the real user 701 in the real world. The user's eye, roughly at the same position as the device's camera 702, is 1.5 m above the ground. The user takes one step forwards.

FIG. 7B shows the user's avatar 703 in a virtual world. The user avatar takes a step forward into a crater 704, and the avatar eye drops from 1.5 m above the ground to 0.5 m above the ground. The virtual world ground is 1 m higher than the real world ground. Generally the user's avatar will not be carrying a mobile device 705 in the virtual world, but one is shown to simplify comparing real and virtual fields of view.

The simulation system 107 makes the following assumptions:
- the real world ground is flat and level, and
- the user has a reasonably open real world space to walk around, with no or very few near field real world obstructions, such as 801 in FIG. 8D.

The simulation system has the following goals.

Goal 1. Make the Ground Planes Align.

The virtual ground is now only 0.5 m away. But, because the real user is not actually in a crater, the real world ground plane is still being recorded by the mobile device as 1.5 m away. It would look strange if the virtual and real worlds were overlaid without an alignment. The perspective would look wrong.

Goal 2. Show Both Real and Virtual Worlds.

Part of the magic of augmented reality is that fantastical 3D objects seem to appear in the real world. We don't wish to solve our problem by, whenever the user's height changes, jarringly shutting off the real world camera view and presenting the user solely with a virtual world view including a prefabricated virtual ground plane that looks nothing like the actual real world around the user.

Goal 3. Cover the Ground Gap.

We do not require the device camera 702 to have a wide field of view. Therefore, in the real world, the camera only sees the ground starting at 707, which corresponds to FIG. 7C. The part of the ground near the user's feet 706 is unseen, because it is below the camera's field of view.

The virtual world also has a simulated "field of view" because the virtual world is only visible to the real world user as shown on a mobile device screen. The real user does not see the virtual world all at once; there are limits based on the left, right, top, and bottom of the mobile device screen. Notice that the virtual field of view 705 touches the ground much closer to the user 709.

If the system uses the camera view of the real world camera view, as shown in FIG. 7C, to generate a virtual ground 1 m closer to the user, this creates a "Ground Gap". That's the gap between the closest ground that can be seen in the real world view 707, as mapped to 710, and the closest ground that can be seen in the virtual field of view 709. The system can't draw part of the virtual ground, from 709 to 710, because that portion of the corresponding real world ground is literally not being seen 706 by the real world camera.

Goal 4. Be Lightweight.

We want any algorithms used by the Simulation System 107 to be instant, lightweight, and real-time. Whenever the user's avatar moves vertically, the system should not halt the experience and require the user to scan all around the environment to build a 3D model of the real world.

Instead, the system 107 just needs to identify the real world ground plane once at the start of the augmented reality experience. Then, as the computer device's location sensor(s) track user movement, the system can also track the relative movement of the real world coordinate system. This means that the system always knows the position and orientation of the real world ground plane relative to the user, no matter how the user moves, without visually redetecting it.

Solution

Before the user steps forward, the user avatar's height has not changed yet, and the real and virtual ground planes are aligned. So at that moment the augmented reality experience is delivered as in prior art. Virtual world 3D objects, such as this crater 704 and this robot 711, are overlaid on top of an unmodified real-time camera view of the real world. The system tracks the relative position and orientation of the mobile device to the real world, and modifies the user's virtual viewpoint as shown on the device screen.

Then the user steps forward. In the real world, the user is still on level ground 702, but in the virtual world, the user avatar descends by 1 m 705.

To handle this, the augmented reality simulation system 107 may:

1. Defines a "sample" area of the device camera's real-time view, from 707 to 705, which corresponds to the area at the bottom of FIG. 7C, with the distance between the user and 705 being an arbitrary constant,
2. Designates anything beyond 705 as the Real Ground Beyond the Sample,
3. Flattens out the sample as it would appear on the real world ground plane, like 712. The flattening may be implemented as a change in perspective, typically determined by a transformation of the sample shape. If the grass and the flower stick up vertically a few centimeters from the ground plane, that change in perspective can be ignored. The illusion is good enough, and according to Goal 4 we don't want to be forced into interpreting the real world in 3D beyond the simple initial detection of the real world ground plane.
4. Creates a "virtual world ground plane" by placing this sample from the real world between 710 and 713. The distance from the user avatar to the virtual sample along the X axis is the same as the distance from the real user to the real sample along the X axis, which is important for edge conditions. (At time zero, just as the user steps forwards and downwards, the system generated "virtual world ground plane" must match the real world ground plane.)
5. Fills in the virtual world ground plane above the sample, with the real world view of the Real Ground Beyond the Sample 714, which stretches to the horizon line 715 that is calculated as in 612 and 613, and also with its perspective modified as was done with the Sample in 712.
6. Fills in the screen above the horizon with the real world sky view 716. This is simply everything from the real world camera view above the horizon line.
7. Fills in the virtual world ground plane below the sample, either by:
   a. Tiling the sample as shown between 709 and 710. The first and then every other tiling could be mirrored perpendicular to the eyeline axis (which in the figure is the X axis), so that the edges don't show a sharp disconnect. This illusion is generally good enough, because most real world ground surfaces are homogenous looking. One patch of grass looks sufficiently like another.

b. Or by making just a single tile, as in FIG. 9A, by copying and then stretching the sample along the eyeline axis (which in the figure is the X axis). The system stretches the tile to the user's feet so that no matter how far down the user looks, the virtual ground is there to see. The tile may be mirrored. In this case, Tile 1 and Tile 2 would be replaced by a single tile of the stretched sample, as in 801 in FIG. 8A-8D. This solution has fewer seams in the image, but because of the stretching the image quality would be less pixel dense.

The result is the user view shown in FIG. 7D:

at the top of the view is the Sky, taken from the real world view at 716, below that is the horizon line, which as in 606 and 613 are at the same height, because the virtual avatar's field of view is matched to the same angle tilt as the real user's field of view, below that is the Beyond the Sample, reaching to the horizon, below that is the Sample, below that is Tile 1, the mirror of the sample along the X axis, and below that is Tile 2, the unmirrored sample.

If the user were to tilt the camera to look farther downwards in FIG. 7D, he or she would see the 3D model 704 representing a hole or depression in the landscape, such as the virtual crater that the user walked into. This hole does not of course exist in the real world, so it meets user expectations for the hole to be shown as a 3D model that simply covers the real world view.

If the user were to turn the camera to look farther to the right, he or she would see the 3D model robot, laid over the "virtual ground".

Why use the Real Ground Beyond the Sample, as shown at 714 and 715? Why not just use the sample all the way to the horizon line? Because:

the pixel quality of the ground diminishes when it is the farther away, it is not good for tiling, because the closer that the system "samples" towards the horizon line, the more likely it is that some obstruction like the house in FIG. 8D will obscure the mobile device camera 702 being able to actually see and sample the ground.

Similarly, if the real world space is known to be limited and to have obstructions at a distance like 608, the Real Ground Beyond the Sample 714 could terminate before the horizon line at some fixed estimated distance. Then everything above it would be rendered as if it were part of a single "sky" view. For example, in 801, we would not want the top half of the building and the lower half of the building (above and below the horizon) rendered with different types of perspective 802. Better to render the entire building without any ground plane perspective by shortening the Beyond the Sample.

Optional Ways to Handle the Sky

FIGS. 8A to 8D show optional ways to handle the sky, when the user avatar is at a different height in the virtual world than the real user in the real world.

Just as the ground plane can be reshaped when the user avatar is at a different height than the real user, the sky could also be handled and modeled, to cover any "sky gap", analogous to the visual ground gap described in FIG. 7B.

The sky could be modeled as a "tilted forward" flat plane as in FIG. 8A, a flat backdrop as in FIG. 8B, or a panoramic backdrop as in FIG. 8C, which could be cylindrical or spherical.

However, it is typically better to leave the sky alone, to render the view above the horizon without modification as it is seen by the real world camera, because:

unless the "sky" is very close to the user, for example a ceiling in an indoor environment, the change in perspective for small height differences is too small to matter, usually the "sky" will be featureless, and therefore small shifts in the perspective again don't matter, and treating everything above the horizon as a very distant "sky" may introduce visual flaws if there is any obstruction above the horizon line such as 608. In common usage scenarios, where the user is in some reasonably open space 801 to walk around in (without which there is no point to have an augmented reality walking experience), obstructions are more likely to block the sky than the ground because buildings and trees are taller than humans, so are viewed mainly above the horizon line, as in FIG. 8D, and such relatively nearby objects may look strange 802 if included as part of an adapted "sky view".

To restate that, in a relatively open and walkable outdoor area, it's less dangerous to assume that the ground is completely visible than to assume that for the sky. Therefore the augmented reality simulation system may wish to generate a virtual ground from the real world ground view, but forego generating a virtual sky from the real world sky view.

Example With User Translation Forwards or Backwards Along the XY Plane

FIG. 9A to 9C show how to handle the user translating forwards or backwards.

FIG. 9A gives the initial condition, before the user avatar moves vertically in the virtual world. A sample is taken from the real world view, as seen by the camera, and in this case is either tiled (not shown here) or mirrored and stretched (as shown) to fill in the ground gap from the user's feet to the bottom of the device's camera view 901.

If the user were to suddenly look down, the virtual ground at his or her feet would be visible without any perspective distortions. It's important that the augmented reality experience system does not take the visual sample until the very first moment that virtual movement begins, so that the edge condition of the virtual generated ground plane suddenly replacing the real world ground plane view.

Then in FIG. 9B the user moves forward. This could be along any direction in the XY plane but in the diagram happens to be along the X axis. Because of this movement, part or all of the real world ground from the original sample is no longer visible to the device camera. To cover the new ground gap, between the user's new foot position 903 and the new bottom of the field of view 904, the simulation system simply retains the previous sample in memory and continues to render it, while taking a new sample farther out, or instead adapts the original "Beyond" sample.

If the user moves backwards, as in FIG. 9B, the original sample is still in the field of view 905, so it can either be continuously re-sampled in real time, or the original sample can just be remembered and used.

The system does not need to re-sample the ground closer to the user than 907, because 907 is the point on the X Axis where the user avatar changes virtual height. That can only happen if the virtual terrain descends, and therefore there will be a 3D model of the virtual world terrain. In other words, as the field of view moves back to 905, the system does not need to cover the space between 906 and 907, because that will be covered by the 3D model of the crater that the user avatar just walked into. The virtual ground farther away than 907 is still covered by the original sample taken in FIG. 9A.

Finally, notice in FIG. 9C that when the user avatar is close to the ground 909 in the virtual world, the field of view covers a smaller area on the ground plane 910 compared to the real world user farther from the ground 911 and the visible area on the ground plane 912. Therefore, as long as the user's virtual avatar is lower than the real world user, there will always be sufficient visual real world ground samples in the big field of view 912 to cover any needed virtual ground in the smaller virtual view 910, no matter how much the user rotates or translates or tilts the phone.

Examples with User Moving Sideways and Rotating

Figure 10B:
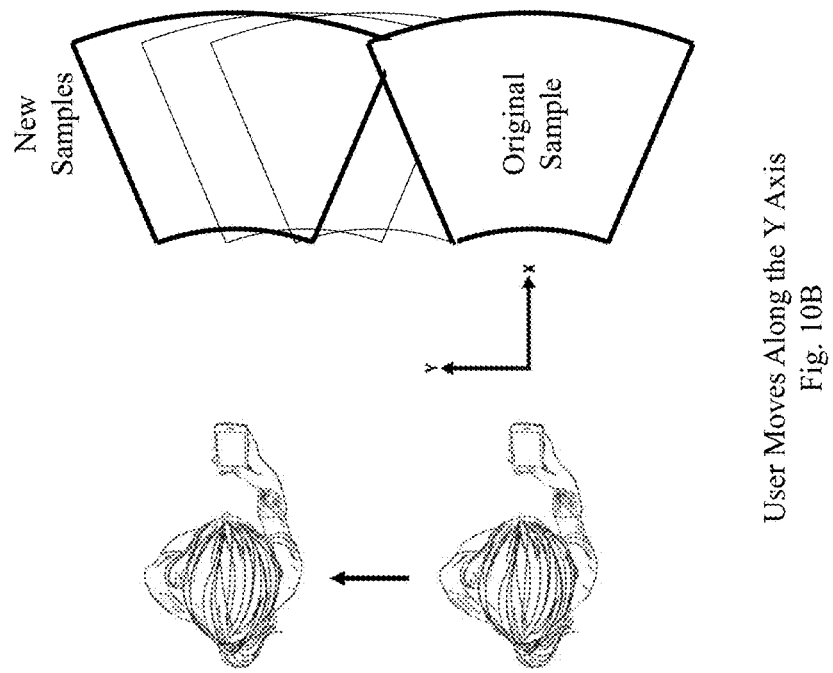
FIGS. 10A and 10B show how to handle the user moving sideways or rotating.
Figure 10A:
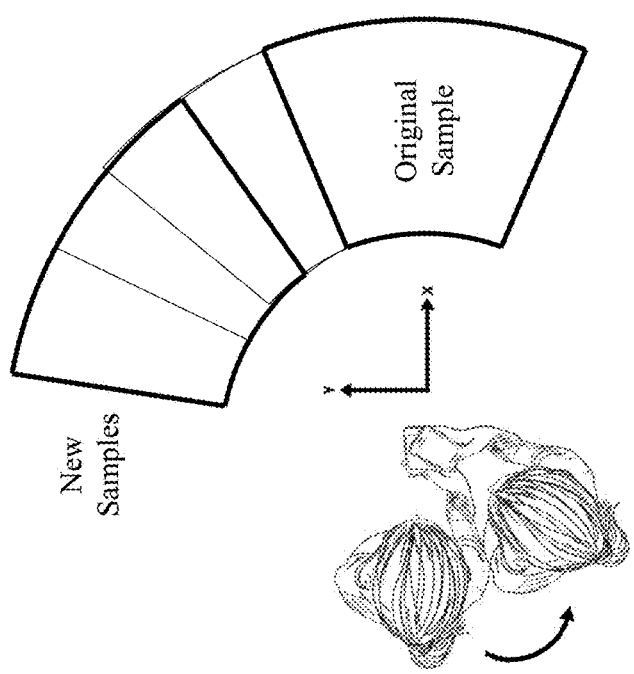

FIGS. 10A and 10B show how to handle the user rotating around the Z axis. Note that in these figures, the device camera field of view is only 30°, to exaggerate the effect. A typical smart phone has a field of view of 60° to 90°, making the following problem less troublesome most of the time.

If the user turns left or right, as in FIG. 10A, the augmented reality simulation system continues to make new samples of the real world ground plane and fill in gaps in the virtual world ground plane. To simplify the diagram and the following explanation, the user's movement is shown to be a rotation around the center point of the device's camera, even though people do not usually move this way in the real world.

Similarly, if the user moves sideways, as in FIG. 10B, the system also continues to make new samples of the real world ground plane and fill in gaps in the virtual world ground plane.

In both cases, by copying and stretching the new samples, the augmented reality simulation system can cover any new "ground gap" in the virtual ground plane, visible to the user on the mobile device's screen in the mobile device's new position.

Example with the User Tilting the Field of View

FIGS. 11A to 11D show how to handle the user tiling the device camera view.

Tilting Down Normally

The user begins a descent in FIG. 11A with a normal tilt of the device 1101. Then in FIG. 11B the user tilts the phone down to another normal angle 1102.

The original Sample of the real world ground 1103 is still visible 1104 to the tilted down device camera, so no adjustment is needed. The augmented reality simulation system continues to use the original sample to cover the ground gap, as in 709 to 710.

Tilting Up Normally

Again the user begins a descent in FIG. 11A with a normal tilt of the device 1101. Then in FIG. 11C the user tilts the phone up to another normal angle 1105.

The original Sample of the real world ground 1103 is no longer visible to the device camera 1106, but the augmented reality simulation system continues to use the stored memory of the original sample, to cover the ground gap as in 709 to 710.

Initial Case With Extreme Tilting Up

In FIG. 11D, the user begins a descent into the virtual crater with an extreme tilt of the device camera 1107 that only results in a Sample 1108 of the real world ground that is very far away. (If the camera tilt is completely above the horizon line then the virtual ground would not be visible and does not matter.) While this does not limit the present invention from working in full, this Sample will have relatively fewer pixels, because it is far from the camera.

Fortunately, in such a situation, the virtual ground visible at such an angle 1109 is also far from the camera, and at an extreme perspective, so pixel quality matters less. Thus this edge condition does not materially affect the usefulness of this approach.

Despite that, if the user suddenly tilts the camera downwards, there may be edge cases when the augmented reality simulation system decides to throw away the previous Sample 1108 and make a new sample. This would cause a visual disconnect on the virtual ground surface which can be handled for example by fading from one view to the next.

Handling an Extreme Downwards Tilt

FIGS. 12A to 12D show how to handle the user tilting the device dramatically downwards.

FIG. 12A shows the initial condition, where the user begins a vertical descent with the device camera tilted slightly upwards 1201. As before, the system finds a Sample 1202 which is used as in FIG. 12B, a top-down view, to create a virtual ground plane with a Beyond region 1203, the Sample 1204, and a tiling of the sample 1205 to cover any ground gap.

Then in FIG. 12C, the user tilts the device camera so far downwards 1206 that the original Sample 1207 is out of the field of view. This is not a problem because the original sample is held in memory, as is the tiling that covers the ground gap at the user's feet from 1208 to 1209.

However, what happens if, as in FIG. 12D, another top-down view, the user turns left (counter-clockwise) so that the field of view is 1210?

At this point the user is no longer looking at the previous ground gap 1211 which was created from the original Sample 1212. Although the ground gap could be covered by a new sample from 1210, this would not be contiguous with 1211.

This can be solved by chopping the Tile 1205, Sample 1204, and Beyond 1203 at some angle A and copying the resulting wedges 1211, 1212, and 1213 counter-clockwise, mirroring them so that there's no seam. If the user continues to turn left, this could be done again and again, and even if the Angle A is not evenly divisible into 360°, leaving for example 1214 remaining in a rotation, the system could just continue to mirror and copy the wedge, overwriting the original Tile 1211 and Sample 1212.

A similar process works if the user rotates to the right, or if the user moves sideways to the left or right (along the Y Axis) instead of turning.

More generally speaking, this approach can apply when the device camera falls behind the player's virtual movement and the simulation system can no longer generate a smooth, contiguous real world view. At such points, the augmented reality simulation system 107 should reset, throwing away the previous Sample and making a new sample. If that causes a visual disconnect on the virtual ground surface, that may be handled for example by fading from one view to the next.

Fortunately, a reset may never be necessary, because this special case is highly unusual.

The system doesn't "break" unless the user looks at his or her feet while turning a large angle:

Although the Sample 1204 in this diagram only has a field of view of 60°, notice that Tile 1205 has a much wider field of view, from 1215 to 1216. The user would have to turn almost all the way around for the tile 1205 to not cover the nearby virtual ground.

Although the Sample 1204 in this diagram only has a field of view of 60°, a typical smart phone has a field of view of up to 90°. If the field of view were wider, 1205 would have an even wider field of view.

Unless the Crater 1217 is absolutely tiny—and as noted earlier realistic virtual landscapes would typically not have slopes greater than 45° so changing terrain generally could not be tiny—as the user 1218 continues to turn counter-clockwise, ultimately the 3D model of the crater will block the view of the virtual ground. That would be a great time for the augmented reality simulation system to reset the virtual ground by taking a new real world Sample, without the user noticing.

Thus, although extreme special cases could cause a hard reset of the virtual ground, creating a jarring discontinuity, the need for this should be quite limited in practice.

Handling an Extreme Upwards Tilt

FIG. 13 shows how to handle an extreme upwards tilt of the device camera.

In FIG. 13A, in the initial condition, when the user begins to descend, the device camera is tilted downwards 1301. Because the desired Sample location 1302 is outside of the field of view 1301, the visual sample of the real world ground 1303 is chosen from the top of the field of view, not the bottom. In this initial case, the horizon 1304 is not in view, so there is no "Beyond" visual sample such as 714 and 715.

Then, as in FIG. 13B, the user tilts the device upwards 1305 and the original Sample 1306 may not be in the field of view. But the augmented reality simulation system still has the sample in memory and can copy it outwards, away from the user, either tiling it or stretching it towards the horizon line, as in FIG. 13C, a top-down view.

If the user rotates as in 1210, a similar method of rotational tiling would preserve a smooth and contiguous looking virtual ground plane. Or the augmented reality simulation system could choose to reset with a new real world ground sample, perhaps fading out the old virtual ground and fading in the new real virtual ground to minimize the jarring disconnect.

Build a Virtual Ground When the User Moves Downwards

So far all discussion has been about the user avatar moving lower than the real user. FIGS. 14A to 14C show when the user avatar moves higher than the real user.

As in FIG. 14A, the field of view in the virtual world 1401 will be farther away from the aligned real and virtual ground planes 1402 than the field of view in the real world 1403. As in previous examples, the augmented reality simulation system 107 can take a visual sample of the real world ground from the device camera 1404, to cover the virtual ground.

However, note in FIG. 14B that when the field of view is low 1405, less of the ground is seen 1406. When the field of view is high 1407, more of the ground is seen 1408. To fill the virtual ground plane 1408 with a real world view 1406 will be a more artificial process requiring extensive left-right tiling as in FIG. 14C. As the user moves it will be harder to access new real-time ground samples without seams appearing. So a hard reset of the visual ground may be required in these cases.

When the Real World Ground is Not Flat or Level

FIG. 15 shows how to handle the case when the real world ground is not flat and level.

As in FIG. 15A, if the real world ground is flat but not level, the augmented reality simulation system visually determines the real world ground plane, as in 206 and then visually selects a Sample 1501 of that ground. Just as previously, the system then converts it to a planar view as in 712 and then applies it with perspective to the virtual ground, as in 710. Just as previously, the Sample may need to be tiled, as in 709.

If the virtual ground is itself flat but sloping, or hilly, additional modifications to the real world sample and tiling can cover it with the proper perspective.

As in FIG. 15B, if the real world ground is uneven 1502, technically for a perfect rendering the augmented reality simulation system would need to build a complicated 3D model of the real world ground surface, visually or with a built-in device sensor like LiDAR.

However, to keep the simulation system 107 lightweight, and not task the user with needing to halt the experience and rescan the real environment, in practice—if the rises in the landscape such as hills do not have severe slopes, which would be unusual in a real world situation where the user is expected to walk around—it is sufficient to "detect" an approximate flat ground real world ground plane, which may be level or sloped.

And as the user walks, the system may occasionally recalibrate the approximate real world ground plane, especially triggered if the user's real world height changes significantly. For example:

at location 1503 the real world ground plane could be approximated as a flat but upwards sloping plane 1504,
 at location 1505 the real world ground plane could be approximated by a plane sloping downwards along one axis 1506, and
 at location 1507 the real world ground plane could be approximated by a plane sloping downwards along two axes 1508.

Those approximate real world ground planes would be used to take visual samples that, when used to generate a virtual ground plane, give sufficient perspective to immerse the user into the augmented reality experience.

High Level Logical Flow

Figure 16:
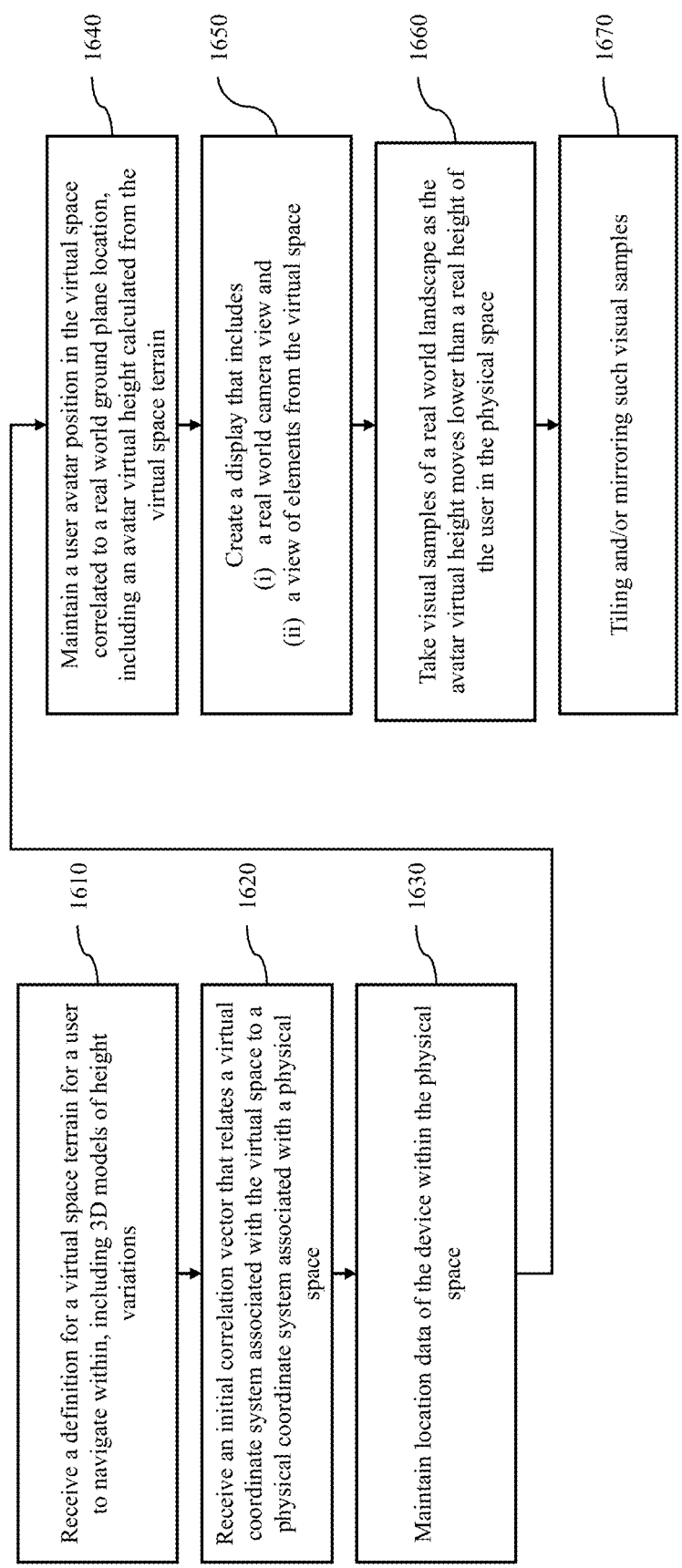
FIG. 16 is an example logical flow.

The reader will now appreciate that the virtual experience may be implemented as a software program executing on one or more data processors or some other electronics that implement logical flows. FIG. 16 is an example logical flow.

First, in step 1610 a definition for the user to navigate is provided, including a 3D virtual space terrain that is not flat. The virtual space terrain may for example include holes or hills.

In step 1620, an initial correlation relates a virtual coordinate system associated with the virtual space to a physical coordinate system associated with a physical space.

In 1630, location data of the portable electronic device within the physical space is also maintained, with the location data responsive to the estimates of physical location of the portable electronic device, and including position, orientation, and acceleration data;

At 1640, a user avatar position in the virtual space is then correlated to a real world user ground plane location within the physical space, including an avatar virtual height calculated from the virtual space terrain.

At 1650, a display is then created on the portable electronic device in a particular way. This display includes (i) a real world camera view; and (ii) layered above that real world camera view, a view of elements from the virtual space, including a rendering of 3D models where the virtual terrain changes from being flat.

Per 1660, as the avatar virtual height moves lower than a real height of the user in the physical space, the approach further involves taking visual samples of a real world landscape and per 1670, tiling and/or mirroring such visual samples, based on a virtual world perspective.

As a result, the virtual world displayed on the user's device is composed of (a) the virtual world ground and (b) the virtual world sky (everything above the horizon line and (c) the contents of the virtual world like trees, creatures, buildings, most of which sit on the virtual ground. A realistic seeming virtual ground can then be generated by further using portions of the real-time camera view of the real world ground.

Other Implementation Options

The foregoing description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the data processing systems, or wireless communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described. As is known in the art, such a computer may contain one or more central processing units, disks, various memories, and input/output ports that enable the transfer of information between the elements. The central processor units provide for the execution of computer instructions. One or more memories provide volatile and/or non-volatile storage for these computer software instructions and data used to implement an embodiment. Disks or other mass storage provides non-volatile storage for these computer software instructions and data used to implement, for example, the various procedures described herein. The instructions may therefore typically be implemented in hardware, custom designed semiconductor logic, Application Specific Integrated Circuits (ASICs), Field Programmable Gate Arrays (FPGAs), firmware, software, or any combination thereof. In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

It is understood by those skilled in the art that various changes in form and details may be made therein without departing from the legal scope of this patent as encompassed by the appended claims.

What is claimed is:

1. A method of operating a portable electronic device to provide a virtual experience system, the method comprising:
    a) receiving a definition for a virtual space for a user to navigate within, including a virtual space terrain that has 3D models of a non-flat virtual space terrain, including but not limited to height variations, ups and downs, in the virtual space terrain;
    b) receiving an initial correlation vector that relates a virtual coordinate system associated with the virtual space to a physical coordinate system associated with a physical space;
    c) maintaining location data of the portable electronic device, within the physical space, the location data responsive to estimates of physical location of the portable electronic device, and including position, orientation, and acceleration data;
    d) maintaining a user avatar position in the virtual space correlated to a real world ground plane location within the physical space, including an avatar virtual height calculated from the virtual space terrain;
    e) creating a display on the portable electronic device comprising:
        i. a real world camera view;
        ii. layered above that real world camera view, a view of elements from the virtual space, including a rendering of 3D models where the virtual terrain changes from being flat, and
    f) as the avatar virtual height moves lower than a real height of the user in the physical space, taking visual samples of a real world landscape and tiling and/or mirroring such visual samples, based on a virtual world perspective.

2. The method as in claim 1 further comprising calculating the avatar virtual height and position from rules that relate to the virtual experience instead of matching precisely to the user's real world location.

3. The method as in claim 2 additionally comprising handling a case where the user's virtual height rises above the real height, by resetting the virtual landscape, including taking new visual samples of the real world landscape.

4. The method as in claim 1 further comprising stretching the real world visual samples instead of tiling.

5. The method as in claim 3 additionally comprising handling a case where the user's virtual height rises above the real height, by resetting the virtual landscape, including taking new visual samples of the real world landscape.

6. The method as in claim 1 further comprising taking the visual samples of the real world, as seen by a device camera, and altering the visual samples to create a virtual sky backdrop.

7. The method as in claim 6 additionally comprising handling a case where the user's virtual height rises above the real height, by resetting the virtual landscape, including taking new visual samples of the real world landscape.

8. The method as in claim 1 further comprising responding to extreme virtual viewpoints by determining whether to build a virtual landscape by:
   a) further tiling previous visual samples; or
   b) resetting the virtual landscape by taking new visual samples of the real world landscape.

9. The method as in claim 8 additionally comprising handling a case where the user's virtual height rises above the real height, by resetting the virtual landscape, including taking new visual samples of the real world landscape.

10. The method as in claim 1 further comprising adapting the real world visual samples to account for perspective when the real world landscape is flat but sloped.

11. The method as in claim 10 additionally comprising handling a case where the user's virtual height rises above the real height, by resetting the virtual landscape, including taking new visual samples of the real world landscape.

12. The method as in claim 1 further comprising adapting the real world visual samples to account for perspective when the real world landscape is not flat, by visually detecting flat landscape planes using a device camera.

13. The method as in claim 7 additionally comprising handling a case where the user's virtual height rises above the real height, by resetting the virtual landscape, including taking new visual samples of the real world landscape.

14. The method as in claim 1 where the virtual terrain that is not flat is generated in whole or in part from real world image samples.

15. The method as in claim 14 additionally comprising handling a case where the user's virtual height rises above the real height, by resetting the virtual landscape, including taking new visual samples of the real world landscape.

16. The method as in claim 1 additionally comprising handling a case where the user's virtual height rises above the real height, by resetting the virtual landscape, including taking new visual samples of the real world landscape.

17. The method as in claim 1 further wherein:
   the real world ground plane is determined from the visual samples of the real world landscape and or from sensors located within the portable electronic device.

18. The method as in claim 17 and further comprising:
   flatting out at least a portion of the visual sample of the real world landscape to generate a flattened sample;
   creating a virtual world ground plane;
   placing the flattened sample within the virtual world such that a distance from a user avatar to the virtual world ground plane along an X axis depends on a distance from the real user to visual sample along the X axis in the real world;
   filling in the virtual world ground plane above the flattened sample, thereby stretching to a virtual horizon line; or
   filling in above the virtual horizon line with a real world sky view.

\* \* \* \* \*